May 19, 1970 — J. MESSANO — 3,512,246

PIPE LAYING APPARATUS

Filed March 14, 1968 — 3 Sheets-Sheet 1

James Messano
INVENTOR.

BY Clarence A. O'Brien
and Harvey B. Jacobson
Attorneys

May 19, 1970    J. MESSANO    3,512,246
PIPE LAYING APPARATUS
Filed March 14, 1968    3 Sheets-Sheet 2
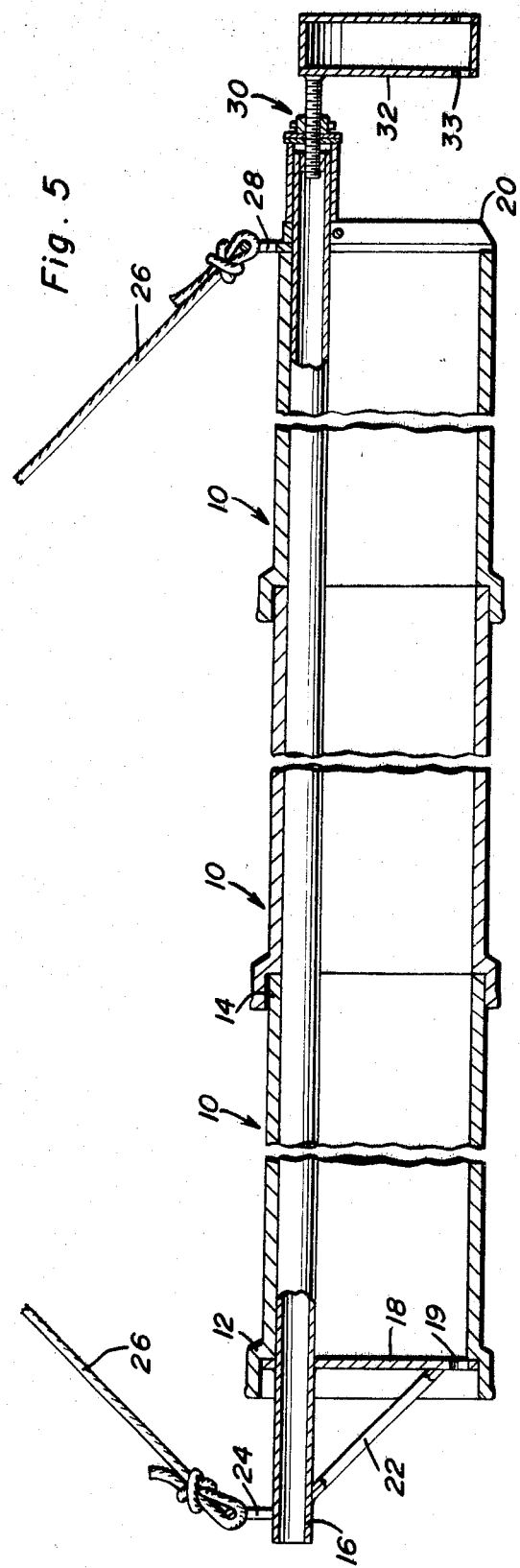
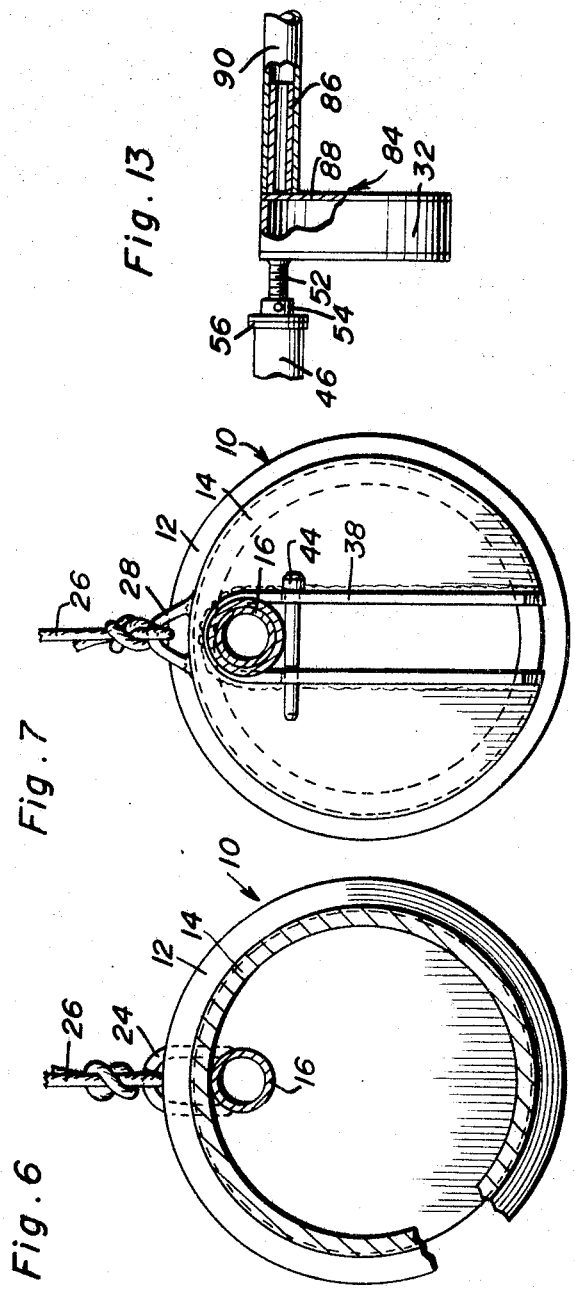
James Messano
INVENTOR.

May 19, 1970
J. MESSANO
3,512,246
PIPE LAYING APPARATUS
Filed March 14, 1968
3 Sheets-Sheet 3
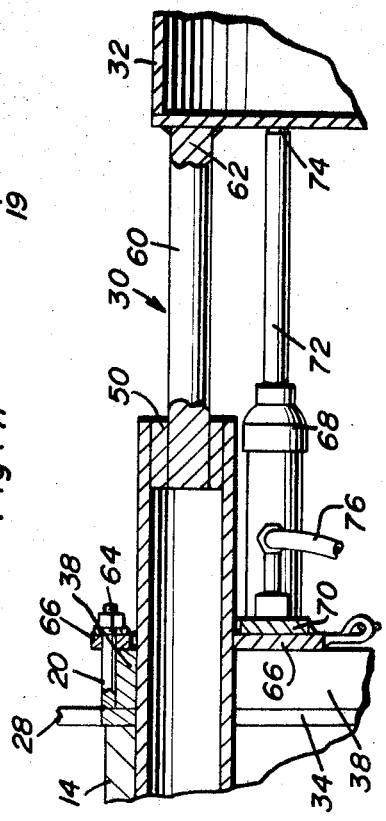
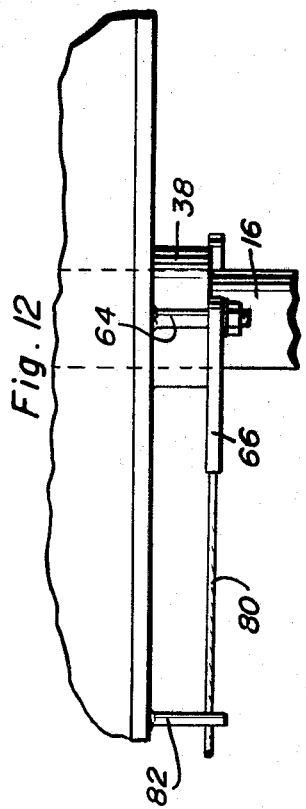
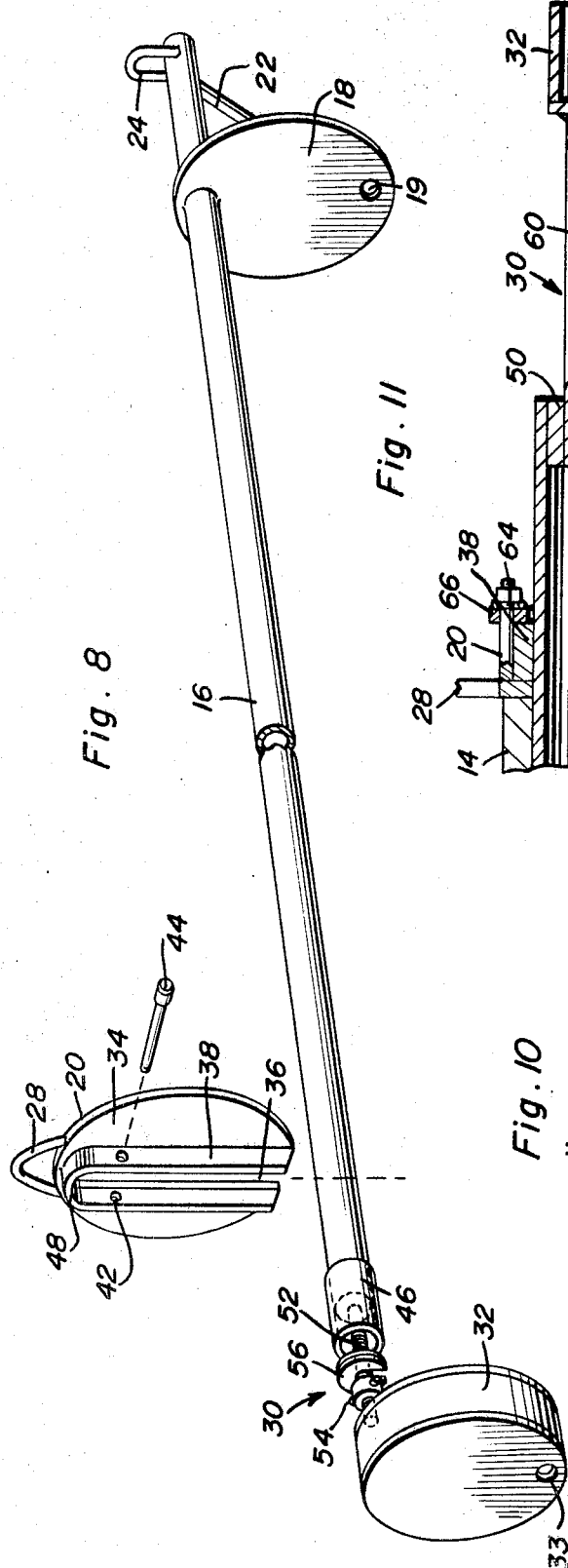
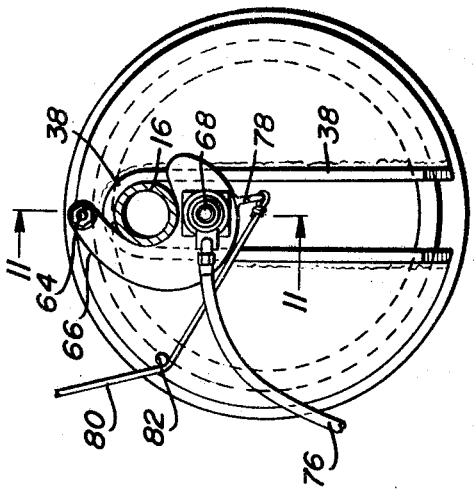
James Messano
INVENTOR.
BY *Clarence A. O'Brien*
*and Harvey B. Jacobson*
Attorneys

United States Patent Office 3,512,246
Patented May 19, 1970

3,512,246
PIPE LAYING APPARATUS
James Messano, Box 453E, W. 5th St.,
Delta, Colo. 81416
Filed Mar. 14, 1968, Ser. No. 713,109
Int. Cl. B23p 19/04, 19/02
U.S. Cl. 29—525                          12 Claims

ABSTRACT OF THE DISCLOSURE

A plurality of conduit pipes are loosely interconnected and supported on a separate pipe support disposed interiorly of the interconnected conduit pipes. The pipe support includes a first fixed jaw at one end thereof and a second movable jaw at the opposite end thereof. These aforementioned jaws are disposed immediately outward of the outward ends of the interconnected conduit pipes. Adjusting means are provided in operative association with the second movable jaw for producing vising action of the jaws with respect to the conduit pipe ends and thereby compressively securing them between the jaws. Lifting means are provided on the pipe support for permitting vertical displacement of the interconnected conduit pipes from a ground level into a trench.

---

The present invention relates to pipe laying and more particularly to the laying of an interconnected plurality of conduit pipes.

In the past, conduit pipes have been laid in a sub-surface trench by means of lowering a single conduit pipe section into the trench and interconnecting said pipe section with already laid pipe sections by means of manual assistance. This procedure requires a man to work in the trench and maneuver the pipe sections into interlocking relation. This situation presents a dangerous environment due to the ever-present possibility of trench cave-in. Further, the present pipe laying practice is generally restricted to the laying of a single conduit pipe section which presents a time consuming procedure due to the necessity of individual pipe maneuvering in a trench.

In summary, a pipe support is inserted interiorly of a plurality of interconnected conduit pipe sections. Jaw members are positioned at either end of the pipe support and are adapted to compress the outward ends of the conduit pipe plurality inwardly in a vising action which causes snug interconnection and sealing between the conduit pipe sections. A crane or the like machine is employed to lift the plurality and lower the same into a trench where a continuing conduit system lies. The plurality of conduit pipe sections is lowered into the trench and forced into interconnecting relationship with the already present conduit system. It is noted that the present invention obviates the necessity of manually maneuvering conduit pipe sections in a trench. Instead, a plurality of conduit pipe sections are interconnected above the trench which facilitates maneuverability thereof and obviates the inherent danger of life and limb from cave-ins. Further, the present invention lays a plurality of conduit sections instead of individual sections thereby decreasing the time necessary to complete a conduit system and simplifies a pipe laying procedure, fewer men being necessary to attend the task. Still further, the present invention includes a cleanout guide member at the outward end of the pipe support which is caused to be removed after a supported plurality of conduit pipe sections is connected with a previously laid section. The removal of the guide through the plurality of conduit pipe sections causes a cleaning or reaming of the interior thereof for preventing a clogged pipe section.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 5 is a sectional view of the present pipe laying apparatus.

FIG. 6 is a transverse sectional view illustrating the fixed jaw means at one end of a pipe support.

FIG. 7 is a transverse sectional view of a movable jaw means at an opposite end of a pipe support.

FIG. 8 is a perspective view of the components forming the present invention.

FIG. 10 is a transverse sectional view illustrating a hydraulic means for retaining a movable jaw in vising relation with a plurality of conduit pipe sections.

FIG. 11 is a partial sectional view taken along a plane passing through section line 11—11 of FIG. 10.

FIG. 12 is a partial top plan view of the apparatus shown in FIG. 11.

FIG. 13 is a partial cut-away view illustrating a pipe support extension.

Figure 1:
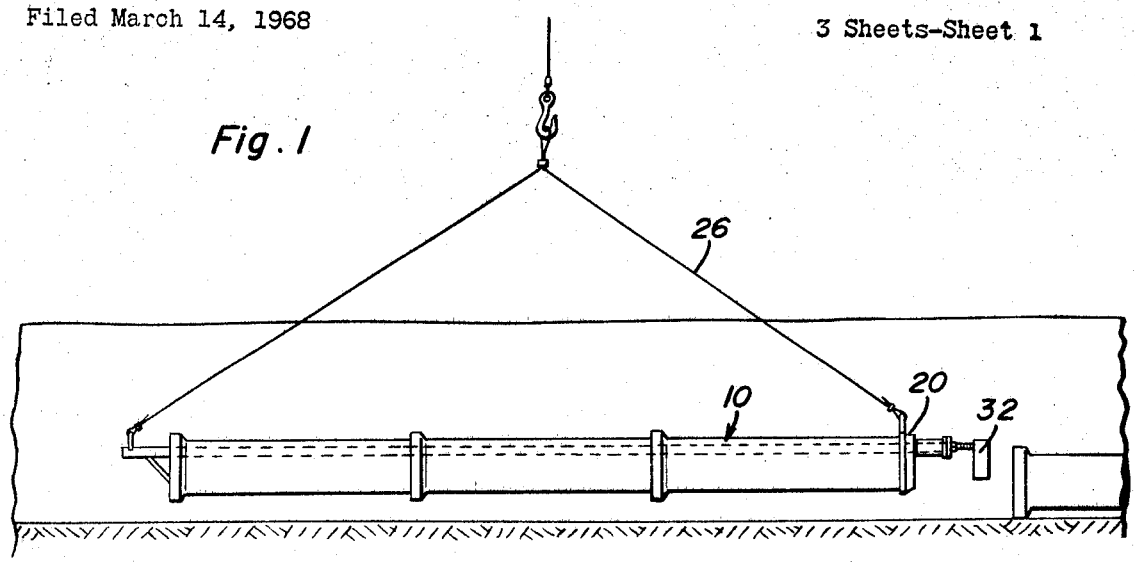
FIGS. 1–4 are elevational views representing a sequence of pipe laying steps.

Referring specifically to the drawings, and more specifically to FIG. 5 thereof, a plurality of interconnected conduit pipe sections 10 are shown in engaged relationship ready to be connected with a previously laid pipe section. Each conduit pipe section 10 includes a bell end 12 and right cylindrical end 14 adapted for insertion into an adjacent bell end. The interconnected conduit pipe sections 10 are supported upon a lift pipe support means 16 which is fabricated from a section of straight pipe. A first jaw member resembling a circular plate is perpendicularly mounted to lift pipe 16 and is disposed in abutting relation with the interior shoulder of the outward bell end of the conduit pipe plurality. For additional rigidification, a brace member 22 is welded at opposite ends thereof to the lift pipe 16 and the outward surface of jaw member 18. A drain hole or aperture 19 is formed through the jaw member to permit drainage from the interior of the conduit plurality. A lifting ring 24 is suitably attached to the lift pipe 16 at the outward end thereof in proximate spaced relation with jaw members 18. A lifting cable 26 is attached to the lifting ring 24, the opposite end of the cable suitably attached to a crane hook or the like which provides motive power for elevating the supported conduit pipe plurality as shown in FIG. 5. The opposite end of the conduit pipe plurality is compressed inwardly by a second movable jaw member or notched gate 20. As will be appreciated, the inward displacement of the jaw members 18 and 20 against their respective ends causes vising action to occur thereby seating the sections comprising the plurality of conduit sections into snug and tightly sealing relation. Removable jaw member 20 includes a lifting ring 28 suitably attached thereto which receives an opposite end of the lifting cable 26. A jaw member adjustment assembly 30 associated with the movable jaw member 20 is manually adjusted until the desired aforementioned vising action is obtained.

The outward end of the adjustment assembly 30 extends to a clean-out guide 32 with drainage holes 33 formed therein. Utilization of this clean-out guide is hereinafter explained.

The particular structure of the movable jaw member or notched plate 20 shown in FIG. 8 includes a U-shaped slot 36 formed inwardly from the periphery of the circular plate portion 34. A U-shaped yoke 38 is outwardly disposed in surrounding relation with the aforementioned slot 36. The opposite surface of the plate functions as a jaw plate. Aligned slots 42 are formed in the arm portions of the yoke 38 and are adapted to retain a removable pin 44 therein. The outward surface of the bight portion 48 of the yoke provides a bearing surface as hereinafter explained. The outward end of the left pipe associated with the adjusting assembly 30 includes a bored collar 50 interiorly fixed thereto and having the inner end portion of an outwardly extending threaded shaft 52 fixed therein. The shaft in turn threadingly engages an adjusting nut 54 in order to achieve vising action by the moving jaw member 20. The adjusting nut 54 is disposed in movable overlying relation with a spacer bushing 56 which in turn bears against one end of a tubular sleeve 46 which in turn bears against the aforementioned bearing surface 48. The outward end of the threaded shaft 52 is indicated by 58 and is suitably attached to a confronting surface of the clean-out guide 32.

Figure 9:
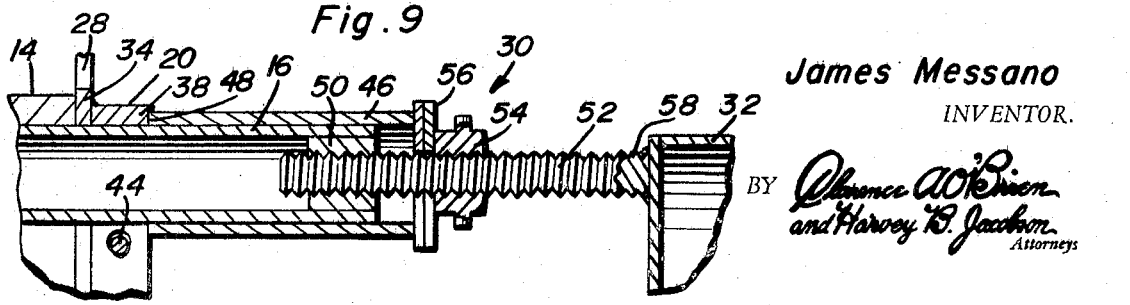
FIG. 9 is an exploded sectional view of a vise adjusting means.

In operation of the device, the plurality of conduit pipe sections are loosely connected. The lift pipe 16 is passed therethrough so as to cause insertion of the fixed jaw member 18 within the outward bell end of the conduit pipe sections. Referring to FIG. 8, the movable jaw member or notched gate 20 is positioned in straddling relation on its pipe 16 so that it becomes seated within the U-shaped slot 36 and more particularly the bight portion thereof. Thus, the outward end of the conduit pipe plurality are engaged by the jaw members 18 and 20 which push the loosely connected pipe sections into snug sealing relation by means of vising action generated when the movable jaw 18 is tightened by means of adjustment assembly 30 as shown in FIGS. 5 and 9. Once achieved, it is possible to maneuver this plurality of conduit sections into interlocking relation with a previously laid section of conduit pipes disposed in the trench.

Figure 2:
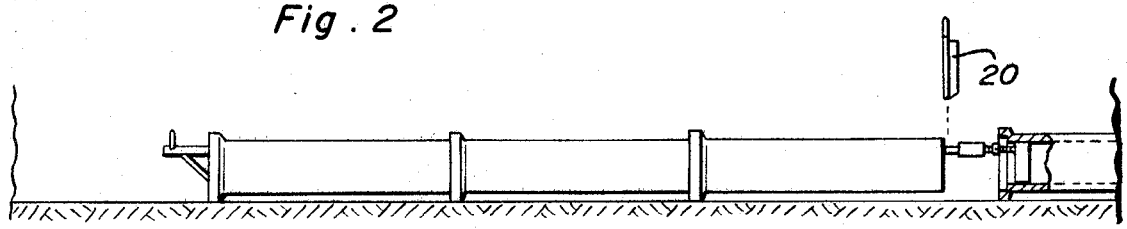
Figure 3:
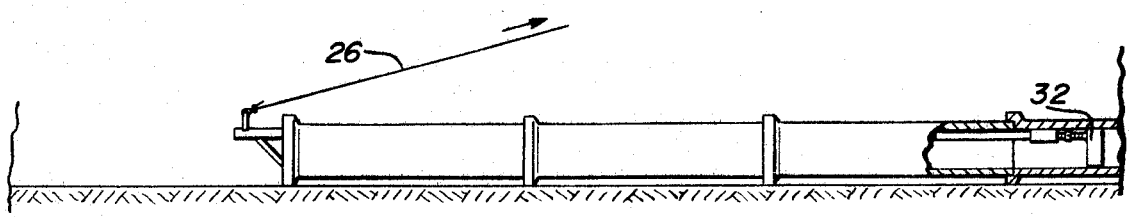
Figure 4:
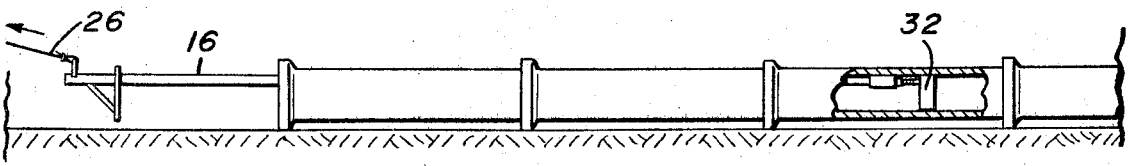

FIG. 1 shows the lowering of the aforementioned plurality of conduit pipe sections into a trench. The clean-out guide 32 furnishes a means of guiding the conduit plurality into engagement with a previously laid section. Once alignment between the sections is accomplished as shown in FIG. 2, the movable jaw or notched gate 20 is loosened by means of the adjustment assembly 30 and vertically removed. A compressive force is exerted upon the opposite end of the conduit plurality as shown in FIG. 3 thereby causing snug interlocking relation between all pipe sections. FIG. 4 illustrates an oppositely directed force upon the cable 26 which causes removal of the lift pipe 16 from the conduit sections. As will be noted, the clean-out guide 32 causes a reaming or cleaning out of the conduit interior thereby preventing clogging of the same.

FIGS. 8 and 9 show the setting pin 44 providing support for the underlying periphery of lift pipe 16 when the latter is straddled by the movable jaw or notched gate 20. Thus, when the pipe is properly inserted the notched gate 20 remains in its straddling position. However, this pin structure requires removal thereof after the plurality of conduit pipe sections has been aligned with a previously laid section as shown in FIG. 2. As will be appreciated, this requires the manual assitance of an individual who must lower himself into the trench. In order to obviate this, an alternate embodiment of the adjustment mechanism 30 is provided as shown in FIGS. 10–12 of the drawing.

FIG. 11 illustrates the modified mechanism as compared with FIG. 9 of the aforementioned embodiment. The modified mechanism includes a solid shaft 60 having one end fixed within the collar 50 and the opposite end suitably attached to a confronting surface of the clean-out guide 32 as indicated by 62. A pivot pin 64 extends outwardly from the plate portion 34 of notched gate 20 in overlying relation with the bight portion 48 of yoke 38. An alternate view of this structure is shown in FIG. 10, which illustrates the pivotal mounting of a hook 66 on the pivot pin 64. The lift pipe 16 is engaged and supported by the inward bight portion of the generally U-shaped hook 66. In its engaged position, the hook is disposed in underlying relation with the plate portion 34 of the notched gate 20 and more particularly in overlying relation with the outward surface of yoke 38. As FIG. 11 clearly illustrates a pneumatic hydraulic jack 68 is suitably affixed to the outward surface of hook 66 as indicated by the reference numeral 70. A selectively projecting ram or piston 72 engages the inward surface 74 of the clean-out guide 32 thereby producing vising or compressive forces upon the hook 66 which in turn causes exertion of compressive forces against yoke 38 in overlying relation therewith. This latter mentioned compressive force causes vising action of the movable jaw or notched gate 20 against an abutting end 14 of the conduit pipe plurality in the same manner as the screw adjustment previously described and shown in FIG. 9. An input pipe 76 provides actuation of the jack 68.

Once the conduit pipe plurality is lowered into a trench and aligned with previously laid sections as shown in FIG. 2, it is necessary to disengage the hook 66 from supporting relation with the lift pipe 16. This is accomplished by a cord pull mechanism shown in FIGS. 10 and 12. The cord mechanism includes an eyelet 78 properly attached to and apending from the outward periphery of the hook 66. A pull cord 80 is attached thereto and is guided around a guide pin 82. Thus, when the proper time for disengagement of the pipe 16 arrives, the cord 80 is pulled thereby disengaging the hook from the pipe. Removal of the notched gate 20 is now possible by simply raising the same from its previous straddling relation with the lift pipe as indicated in FIG. 2.

Attention is directed to FIG. 13 of the drawing which includes an accessory to the present invention in the form of a lift pipe extension indicated by the reference numeral 84. This extension includes a first tubular portion 86 extending perpendicularly outwardly from the outward surface 88 of the clean-out guide 32. Thus, when the need arises to simultaneously maneuver a greater number of conduit sections, than the length of original lift pipe provides, a second lift pipe 90 may be inserted over the tubular section 86. These additional conduit pipe sections may be engaged with those sections on the original lift pipe without impedance by the clean-out guide 32 because the latter is of smaller diameter than the inside conduit pipe diameter.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An apparatus for pulling a plurality of loosely interconnected conduit pipes into snug coaxial engagement, said apparatus comprising, pipe support means adapted to be disposed longitudinally along the interior of a plurality of loosely interconnected conduit pipes, first jaw means for inwardly abutting one end of the pipe plurality, second jaw means for abutting the opposite end of the pipe plurality, means for vising said first and second jaw means so as to cause snug sealing coaxial engagement between pipes of the received pipe plurality.

2. A material handling apparatus comprising elongated support means, first jaw means mounted upon one end portion of said support means, second jaw means operatively associated with a second end portion of said support means, means for vising said first and second jaw means toward one another for handling the material, and means facilitating lifting and lowering of said support means.

3. The apparatus set forth in claim 2 wherein said first jaw means includes a plate fastened to said support means at a first end portion thereof and wherein said second jaw means includes a plate removably positioned in straddling relation with said support means at a second end portion thereof.

4. The apparatus set forth in claim 3 wherein said vising means include a collar disposed inwardly of the second end of said support means, a threaded shaft coaxially fixed to said collar and extending outwardly therefrom, a sleeve member disposed in overlying relation to said second end portion, said sleeve member having a first end abutting said second jaw means and a second end extending outwardly from said second end of said support means, spacer bushing means movably mounted on said threaded shaft in abutting relation with said second sleeve member and adjusting nut means threadingly mounted on said shaft and disposed to cause bearing of said bushing means against said second sleeve end in turn causing vising of said second jaw means against the second end of said support means.

5. The apparatus set forth in claim 4 wherein said second jaw means include a plate portion characterized by an elongated U-shaped slot extending radially therein, a similarly U-shaped yoke fixed in surrounding relation with said slot and removable pin means secured between the straight arm portions of said yoke, said yoke straddling said support means, said pin disposed in underlying supporting relation to said support means.

6. The apparatus set forth in claim 3 wherein said vising means include a collar disposed inwardly of the second end of said support means, a shaft coaxially fixed to said collar and extending outwardly therefrom, bearing plate means perpendicularly fixed to the outward end of said shaft, a swivelling hook disposed in underlying support of the second end portion of said support means, jack means mounted on an outward surface of said hook, for selectively generating opposing compressive forces on said second jaw means and said bearing plate means.

7. The apparatus set forth in claim 6 together with manual means for releasing said hook from said underlying support engagement thereby permitting removal of said second jaw means from said straddling relation with said support means.

8. The apparatus set forth in claim 2 including means affixed outwardly of said vising means for guiding the material to preselected engagement with other stationary material.

9. The apparatus set forth in claim 8 including mounting means affixed to the outward surface of said guiding means for mounting a second extension support means concentrically with said mounting means thereby permitting handling of additional material.

10. A method of handling pipe including the steps of positioning support means inside the pipe, engaging the first and second ends of the pipe, moving the supported pipe along and guiding a first end of said pipe to a preselected point, releasing said first end, and, through the engaged second end, pushing the pipe along a predetermined linear path, and removing the support means from the pipe.

11. The method of claim 10 wherein said moving of the pipe comprises the steps of engaging the opposite ends of said support means at the first and second ends of said pipe with a pair of suspension cables and raising the pipe thereby, the release of the first end including a release of the cable adjacent thereto, the pushing of said pipe being effected by a pulling of the second end cable generally in the desired direction of movement of the pipe.

12. The method of claim 10 wherein said engaging of the first and second pipe ends includes the vising thereof.

References Cited
UNITED STATES PATENTS

| | | | |
|---|---|---|---|
| 1,615,008 | 1/1927 | Ferguson. | |
| 3,096,572 | 7/1963 | Simmons | 29—237 |
| 3,181,234 | 5/1965 | Gill | 29—237 |

JOHN F. CAMPBELL, Primary Examiner

WM. I. BROOKS, Assistant Examiner

U.S. Cl. X.R.

29—237; 214—1.5